Patented May 8, 1928.

1,668,767

UNITED STATES PATENT OFFICE.

JAMES HANSON, OF SUNNYVALE, AND EN FON LEE, OF LOCKE, CALIFORNIA, ASSIGNORS TO LIBBY, McNEIL & LIBBY, A CORPORATION OF MAINE.

PROCESS OF DIFFERENTIATING UNCOOKED AND COOKED CANS OF FOODSTUFFS.

No Drawing. Application filed July 20, 1927. Serial No. 207,313.

This invention relates to a process of marking filled cans whereby the condition of the marking will indicate whether or not the can contents have been cooked.

An object of the invention is to provide a color marking for cans which will change from its original color after said color marking has been subjected to a temperature in excess of 212° Fahrenheit.

A further object of the invention is to provide a composition for marking cans filled with uncooked foodstuffs capable of losing its color characteristic after the contents of the cans have been subjected to a cooking temperature above 212° F.

In this specification, the invention is described in the form considered to be the best, but it is to be understood that the invention is not limited to such form, because it may be embodied in other forms, and it is also to be understood that in and by the claims following the description, it is desired to cover the invention in whatsoever form it may be embodied.

In canneries and other places where food stuffs are packaged in cans and other types of containers, it is impossible to see the contents of the cans to determine whether or not the same are cooked or uncooked. Metal cans are outwardly the same after having been placed in a cooking temperature as before. In order to distinguish between cans containing uncooked and cooked products, we have arranged a process of marking the cans so that cans containing a cooked product will bear a different character of marking, after having been through a cooking temperature, than before.

Our process concerns taking cans that are filled with uncooked food stuffs, and sealed preparatory to running the said filled cans through the cookers, and marking such cans with a fluid mixture containing an organic color. The mixture consists of a solution of the consistency of paint, and the ingredients in it preferably consist of a binder of a resinous nature, such as shellac, a solvent, such as grain alcohol, and an organic color, such as erythrocine. The fluid consistency of the solution can, of course, be varied by changing the proportions of the shellac and grain alcohol. We have found that a readily flowing solution of the shellac and grain alcohol of about a gallon in volume, will require about an eighth of an ounce of coloring matter, to suitably color the said volume, although it is to be understood that the amount of coloring matter may be either increased or decreased.

The coloring solution is painted or marked upon the cans containing the uncooked food stuffs. After the cans are suitably marked, they are run through pressure cookers or sterilizers for a period of time sufficient to insure, either cooking or sterilization of the contents of the cans. The cooking temperatures in the majority of all cookers is in excess of 212° F., the boiling point of water, and in most cases the cooking temperature varies anywhere from 230 to 260 degrees, Fahrenheit, obtained by steam pressure. The color marking on the cans is not affected either by boiling water or by a cooking temperature at or around 212 degrees F., and we have found that the color marking will not change on a can that is run through boiling water, at or about a temperature of 212 degrees F., coming out of the cooker in the same condition as when it went in. However, when the temperature in the cooker is in excess of 212 degrees F. and around 240 degrees F. or 252 degrees F., the increased temperature causes the coloring in the marking to change from its original color and to bleach out into a different shade.

The color marking, when first applied to the cans, dries immediately thereon and cannot be washed off with water of any temperature. When subjected to the temperature in excess of the boiling point of water, the color marking on the can changes, but the increased pressure does not tend to scale or remove the marking from the can. After a can with the marking thereon comes out of the cooker, its color will have been changed, but the marking will still remain on the can, to indicate to anyone familiar with the process that cans so marked have had the contents thereof cooked. The bleached or changed colored marking will always remain on the cans and we make no attempt to scrape or otherwise remove it. By our process of marking cans, to indicate that the contents of the cans are either cooked or uncooked, we provide a marking material for the cans which will change color under pressure, which will not come off of the cans when immersed in boiling water, and which will dry on the cans to thereafter indicate that said can has been through a cooking process.

Having thus described this invention what we claim and desire to secure by Letters Patent is:

1. A process to indicate that the contents of cans have been cooked comprising, marking the cans with a color substance prior to cooking the filled cans; and passing the filled cans through a cooking temperature in excess of 212 degrees Fahrenheit to change the color of the substance permanently and indicate the can contents have been cooked.

2. A process to indicate that the contents of cans have been cooked comprising, marking the cans with a color substance not dissoluble in water prior to cooking the filled cans; and passing the filled cans through a cooking temperature in excess of 212 degrees Fahrenheit to change the color of the substance permanently and indicate the can contents have been cooked.

3. A process to indicate that the contents of cans have been cooked comprising, marking the cans with an organic color substance prior to cooking the filled cans; and passing the filled cans through a cooking temperature in excess of 212 degrees Fahrenheit to change the color of the substance permanently and indicate the can contents have been cooked.

4. A process to indicate that the contents of cans have been cooked comprising, marking the cans with an organic color substance not dissoluble in water, prior to cooking the filled cans; and passing the filled cans through a cooking temperature in excess of 212 degrees Fahrenheit to change the color of the substance permanently and indicate the can contents have been cooked.

5. A process to indicate that the contents of cans have been cooked comprising, marking the cans with a solution containing a binder, a solvent and a color, prior to passing the filled cans through a cooking temperature in excess of 212 degrees Fahrenheit to permanently change the marking on the can from its original color to indicate that the can contents have been cooked.

6. A process to indicate that the contents of cans have been cooked comprising, marking the cans with a solution containing a resinous binder, a solvent for the binder and an organic color, prior to cooking the filled cans; and passing the filled cans through a cooking temperature above 212 degrees Fahrenheit to permanently change the marking on the can from its original color to indicate that the can contents have been cooked.

7. A process to indicate that the contents of cans have been cooked comprising, marking the cans with a solution containing shellac, grain alcohol and an organic color, prior to cooking the filled cans; and passing the filled cans through a cooking temperature above 212 degrees Fahrenheit to permanently change the marking on the can from its original color to indicate that the can contents have been cooked.

8. A process to indicate that the contents of cans have been cooked comprising, marking the cans with a solution containing a binder, a solvent, and a color, prior to cooking the filled cans; and passing the filled cans through a cooking temperature of approximately 240 degrees Fahrenheit to change the color marking on the can permanently from its original color to indicate that the can contents have been cooked.

9. A process to indicate that the contents of cans have been cooked comprising, marking the cans with a solution containing a resinous binder, a solvent for the binder and an organic color, prior to cooking the filled cans; and passing the filled cans through a cooking temperature of approximately 240 degrees Fahrenheit to change the color marking on the can permanently from its original color to indicate that the can contents have been cooked.

10. A process to indicate that the contents of cans have been cooked comprising, marking the cans with a solution containing shellac, grain alcohol and an organic color, prior to cooking the filled cans; and passing the filled cans through a cooking temperature of approximately 240 degrees Fahrenheit to change the color marking on the can permanently from its original color to indicate that the can contents have been cooked.

11. A process to indicate uncooked and cooked cans comprising, marking uncooked cans with a color; and subjecting cans so marked to a cooking temperature in excess of 212 degrees Fahrenheit whereby the heat changes the color marking on the cans permanently from the original color, to indicate the cans have been cooked.

12. A process of differentiating cooked and uncooked cans of foodstuffs comprising applying a color substance to the cans and subjecting the marked cans to a temperature in excess of 212° F., the substance on the cans being adapted to change color permanently upon application of a temperature in excess of 212° F.

13. A process of differentiating cooked and uncooked cans of foodstuffs comprising applying a color substance to the cans and then subjecting the cans to a temperature sufficient to cook or sterilize the contents thereof, which said temperature changes the color of the substance on the cans permanently from the original color.

In testimony whereof, we have hereunto set our hands at San Francisco, California, this 13th day of June 1927.

JAMES HANSON.
EN FON LEE.